(12) United States Patent
Bhattacharjee et al.

(10) Patent No.: US 7,765,211 B2
(45) Date of Patent: Jul. 27, 2010

(54) SYSTEM AND METHOD FOR SPACE MANAGEMENT OF MULTIDIMENSIONALLY CLUSTERED TABLES

(75) Inventors: Bishwaranjan Bhattacharjee, Yorktown Heights, NY (US); Leslie A. Cranston, Toronto (CA); Matthew A. Huras, Ajax (CA); Bruce G. Lindsay, San Jose, CA (US); Timothy R. Malkemus, Round Rock, TX (US); Catherine S. McArthur, Uxbridge (CA); Sriram K. Padmanabhan, Briarcliff Manor, NY (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/425,781

(22) Filed: Apr. 29, 2003

(65) Prior Publication Data

US 2004/0220972 A1    Nov. 4, 2004

(51) Int. Cl.
G06F 7/00 (2006.01)
G06F 17/30 (2006.01)

(52) U.S. Cl. .................. 707/737; 707/754; 707/758; 711/170

(58) Field of Classification Search .............. 707/5, 707/6, 2; 711/209
See application file for complete search history.

(56) References Cited

U.S. PATENT DOCUMENTS

| | | | | |
|---|---|---|---|---|
| 5,041,972 A | | 8/1991 | Frost | 364/401 |
| 5,325,445 A | | 6/1994 | Herbert | 382/38 |
| 5,359,724 A | * | 10/1994 | Earle | 707/205 |
| 5,729,730 A | * | 3/1998 | Wlaschin et al. | 707/3 |
| 5,848,408 A | | 12/1998 | Jakobsson et al. | 707/3 |
| 5,864,857 A | * | 1/1999 | Ohata et al. | 707/100 |
| 5,905,985 A | * | 5/1999 | Malloy et al. | 707/100 |
| 5,937,401 A | | 8/1999 | Hillegas | 707/2 |

(Continued)

OTHER PUBLICATIONS

Josephine Cheng et al., "An Efficient Hybrid Join Algorithm: A DB2 Prototype," Data Enginieerng, Apr. 8-12, 1991.

(Continued)

*Primary Examiner*—Hosain T Alam
*Assistant Examiner*—Usmaan Saeed
(74) *Attorney, Agent, or Firm*—Kunzler Needham Massey & Thorpe

(57) ABSTRACT

An information retrieval system and method are provided for minimizing the number of blocks searched in a cell before recording a new record in the table and determining which block can be assigned if a table has space available to store a new record in the case an additional block should be associated with a cell. Dimensions for a table are identified, and at least one block in the table is associated with a dimension value for each dimension, where each block comprises contiguous storage pages. The block can be further associated with a cell; this associated cell has a unique combination of dimension values comprising an dimension value for each of the dimensions. A unique associated bit list for each dimension value for each dimension has a unique corresponding list entry for each block associated with that dimension value, and a unique associated bit list for each cell has a unique corresponding list entry for each block associated with that cell.

21 Claims, 14 Drawing Sheets

U.S. PATENT DOCUMENTS

| | | | |
|---|---|---|---|
| 5,937,431 A * | 8/1999 | Kong et al. | 711/145 |
| 5,943,677 A * | 8/1999 | Hicks | 707/205 |
| 5,963,933 A | 10/1999 | Cheng et al. | 707/2 |
| 5,987,453 A | 11/1999 | Krishna et al. | 707/4 |
| 6,003,036 A * | 12/1999 | Martin | 707/102 |
| 6,105,020 A | 8/2000 | Lindsay et al. | 707/2 |
| 6,122,628 A | 9/2000 | Castelli et al. | 707/5 |
| 6,122,636 A * | 9/2000 | Malloy et al. | 707/102 |
| 6,169,547 B1 * | 1/2001 | Tanaka et al. | 715/838 |
| 6,182,060 B1 * | 1/2001 | Hedgcock et al. | 707/1 |
| 6,253,197 B1 | 6/2001 | Lindsay et al. | 707/3 |
| 6,272,487 B1 | 8/2001 | Beavin et al. | 707/2 |
| 6,341,281 B1 | 1/2002 | MacNicol et al. | 707/3 |
| 6,345,266 B1 | 2/2002 | Ganguly et al. | 707/1 |
| 6,385,603 B1 | 5/2002 | Chen et al. | 707/3 |
| 6,385,604 B1 * | 5/2002 | Bakalash et al. | 707/3 |
| 6,397,204 B1 | 5/2002 | Liu et al. | 707/2 |
| 6,442,560 B1 * | 8/2002 | Berger et al. | 707/2 |
| 6,460,026 B1 * | 10/2002 | Pasumansky | 707/1 |
| 6,505,205 B1 * | 1/2003 | Kothuri et al. | 707/100 |
| 6,546,395 B1 * | 4/2003 | DeKimpe et al. | 707/101 |
| 6,694,322 B2 * | 2/2004 | Warren et al. | 707/101 |
| 6,718,338 B2 * | 4/2004 | Vishnubhotla | 707/102 |
| 7,080,081 B2 * | 7/2006 | Agarwal et al. | 707/100 |
| 7,080,206 B2 * | 7/2006 | Berks et al. | 711/133 |
| 7,236,974 B2 * | 6/2007 | Bhattacharjee et al. | 707/8 |
| 2001/0054034 A1 * | 12/2001 | Arning et al. | 707/1 |
| 2002/0069193 A1 | 6/2002 | Beavin et al. | 707/2 |
| 2002/0078015 A1 | 6/2002 | Ponnekanti | 707/1 |
| 2002/0083037 A1 * | 6/2002 | Lewis et al. | 707/1 |
| 2004/0122868 A1 * | 6/2004 | Chan et al. | 707/200 |
| 2005/0065985 A1 * | 3/2005 | Tummala et al. | 707/201 |

OTHER PUBLICATIONS

"Method for arranging-two-dimensional data in paged memory," Research Disclosure Feb. 2000, pp. 207-209.

"Space and Time Efficient Evaluation of Indexable Conjunctive Predicates," IBM Technical Disclosure Bulletin, vol. 30 No. 3, Aug. 1987.

* cited by examiner

FIGURE 5

Dimension Block Index on YearAndMonth, Province

| 9901,AB | 9901,ON | 9901,QB | 9902,AB | 9902,BC | 9902,ON | 9903,AB |
|---|---|---|---|---|---|---|
| 1, 6, 12 | 9, 19, 39, 41, 42 | 11 | 5, 7, 8, 14, 32 | 2, 15, 17, 31, 33, 43 | 18 | 3, 10 |

SYSTEM AND METHOD FOR SPACE MANAGEMENT OF MULTIDIMENSIONALLY CLUSTERED TABLES

FIELD OF THE INVENTION

The present invention relates in general to database systems and, more particularly, to techniques for providing multidimensional disk clustering in relational databases and for efficient access and maintenance of information stored in relational databases using multidimensional disk clustering.

BACKGROUND OF THE INVENTION

Almost all businesses are interested in deploying data warehouses to obtain business intelligence in order to improve profitability. It is widely recognized in the technical world that most data warehouses are organized in multidimensional fashion. The text by Ralph Kimball et al., *The Data Warehouse Toolkit: Practical Techniques for Building Dimensional Data Warehouses*, John Wiley & Sons, ISBN: 0471153370, 1996, describes the use of multidimensional schema to model data warehouses.

A multidimensional array layout has been used by many online analytical processing (OLAP) systems for organizing relatively small data warehouses. However, this multidimensional array structure does not scale well for large data warehouses such as those that require more than 100 gigabytes of storage. Such large data warehouses are still implemented using the relational database model. While conventional relational databases provide some clustering and data partitioning, these techniques are not adequate for supporting multidimensional data.

OLAP systems tend to organize data using many or all dimensions. For efficiency reasons, the conceptual multidimensional array is actually implemented by a multilevel structure. The dimensions are separated into dense and sparse sets based on the expected number of entries for each dimension value. The dense dimensions are implemented as a multidimensional array and the sparse dimensions are used to point to each sub-array. U.S. Pat. No. 5,359,724 by Earle describes such a technique. This arrangement is still inefficient because the dense dimensions are only partially utilized. For instance, in real-world data, it has been reported that dense arrays are usually only about 20% occupied.

Spatial databases and geographic information systems use a two- or three-dimensional data model. Many data structures and methods have been proposed for organizing and indexing spatial data, e.g., R-Trees, QuadTrees, and Grid Files. Some of these indexing structures have been implemented as extensions of a relational database management system (RDBMS) but have not considered the full requirement for maintenance and query processing required in data warehouses or other such implementations. Additionally, the techniques for efficiently clustering the two- or three-dimensional data have not been considered in these systems.

A multidimensionally clustered table is one whose data is simultaneously clustered along one or more independent dimensions, or clustering keys, and physically organized into blocks of pages on disk. Once such a table is created, one can specify one or more keys as dimensions along which to cluster the table's data. Each of these dimensions can comprise one or more columns as do index keys.

Every unique combination of dimension values forms a logical "cell" that comprises blocks of pages, where a block is a set of consecutive pages on disk. The set of blocks that contain pages with data having a certain key value of one of the dimensions is called a "slice". Every page of the table is part of exactly one block, and all blocks of the table comprise the same number of pages: the blocking factor.

When inserting new records into the table, it is highly desirable that the number of blocks searched in a cell for space to record the new record in the table be minimized. Further, if none of the blocks in the table have space available to store the new record, and an additional block should be associated with a cell, it is highly desirable that it be quickly determinable what block can be assigned.

What is therefore needed is a system and associated method to minimize the number of blocks searched in a cell space to record the new record in the table. The method determines which block can be assigned if a table has space available to store a new record and an additional block should be associated with a cell. The need for such system and method has heretofore been unsatisfied.

SUMMARY OF THE INVENTION

The present invention satisfies this need, and presents a system, a computer program product, and an associated method (collectively referred to herein as "the system" or "the present system") for minimizing the number of blocks searched in a cell before recording a new record in the table and determining which block can be assigned if a table has space available to store a new record in the case an additional block should be associated with a cell.

In one aspect, the invention provides, for an information retrieval system, a method for maintaining clustered data. The method comprises identifying a plurality of dimensions of a table using a plurality of table definition parameters, associating at least one block in a plurality of blocks in the table with an associated cell, the associated cell having a unique combination of dimension values comprising an associated dimension value for each dimension in the plurality of dimensions, clustering data according to dimension value, for each dimension in the plurality of dimensions, by storing the data in the at least one associated block, and, storing storage state information regarding each block in the plurality of blocks.

In another aspect, the invention provides an information retrieval system for maintaining clustered data. The information retrieval system comprises means for identifying a plurality of dimensions of a table using a plurality of table definition parameters, means for associating at least one block in a plurality of blocks in the table with an associated cell, the associated cell having a unique combination of dimension values comprising an associated dimension value for each dimension in the plurality of dimensions, means for clustering data according to dimension value, for each dimension in the plurality of dimensions, by storing the data in the at least one associated block, and, means for storing storage state information regarding each block in the plurality of blocks.

In yet another aspect, the invention provides a computer program product having a computer readable medium tangibly embodying computer executable code for directing an information retrieval system to maintain clustered data. The computer program product comprises: code for identifying a plurality of dimensions of a table using a plurality of table definition parameters, code for associating at least one block in a plurality of blocks in the table with an associated cell, the associated cell having a unique combination of dimension values comprising an associated dimension value for each dimension in the plurality of dimensions, code for clustering data according to dimension value, for each dimension in the plurality of dimensions, by storing the data in the at least one associated block, and, code for storing storage state information regarding each block in the plurality of blocks.

In a still further aspect, the invention provides a computer data signal embodied in a carrier wave and having means tangibly embodied within the computer data signal for directing an information retrieval system to maintain clustered data. The computer data signal comprises: means for identifying a plurality of dimensions of a table using a plurality of table definition parameters, means for associating at least one block in a plurality of blocks in the table with an associated cell, the associated cell having a unique combination of dimension values comprising an associated dimension value for each dimension in the plurality of dimensions, means for clustering data according to dimension value, for each dimension in the plurality of dimensions, by storing the data in the at least one associated block, and, means for storing storage state information regarding each block in the plurality of blocks.

BRIEF DESCRIPTION OF THE DRAWINGS

The various features of the present invention and the manner of attaining them may be described in greater detail with reference to the following description, claims, and drawings, wherein reference numerals are reused, where appropriate, to indicate a correspondence between the referenced items, and wherein:

FIG. 5 is a graphical illustration of an exemplary composite dimension index in accordance with an embodiment of the present invention;

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. An embodiment is implemented in the C or C++ computer programming language (or other computer programming languages in conjunction with C/C++). Any limitations presented would be a result of a particular type of operating system, computer programming language, or data processing system and would not be a limitation of the present invention. An embodiment includes a software programming code or computer program product that is typically embedded within, or installed on a computer. Alternatively, an embodiment can be saved on a suitable storage medium such as a diskette, a CD, a hard drive, or like devices.

Figure 1:
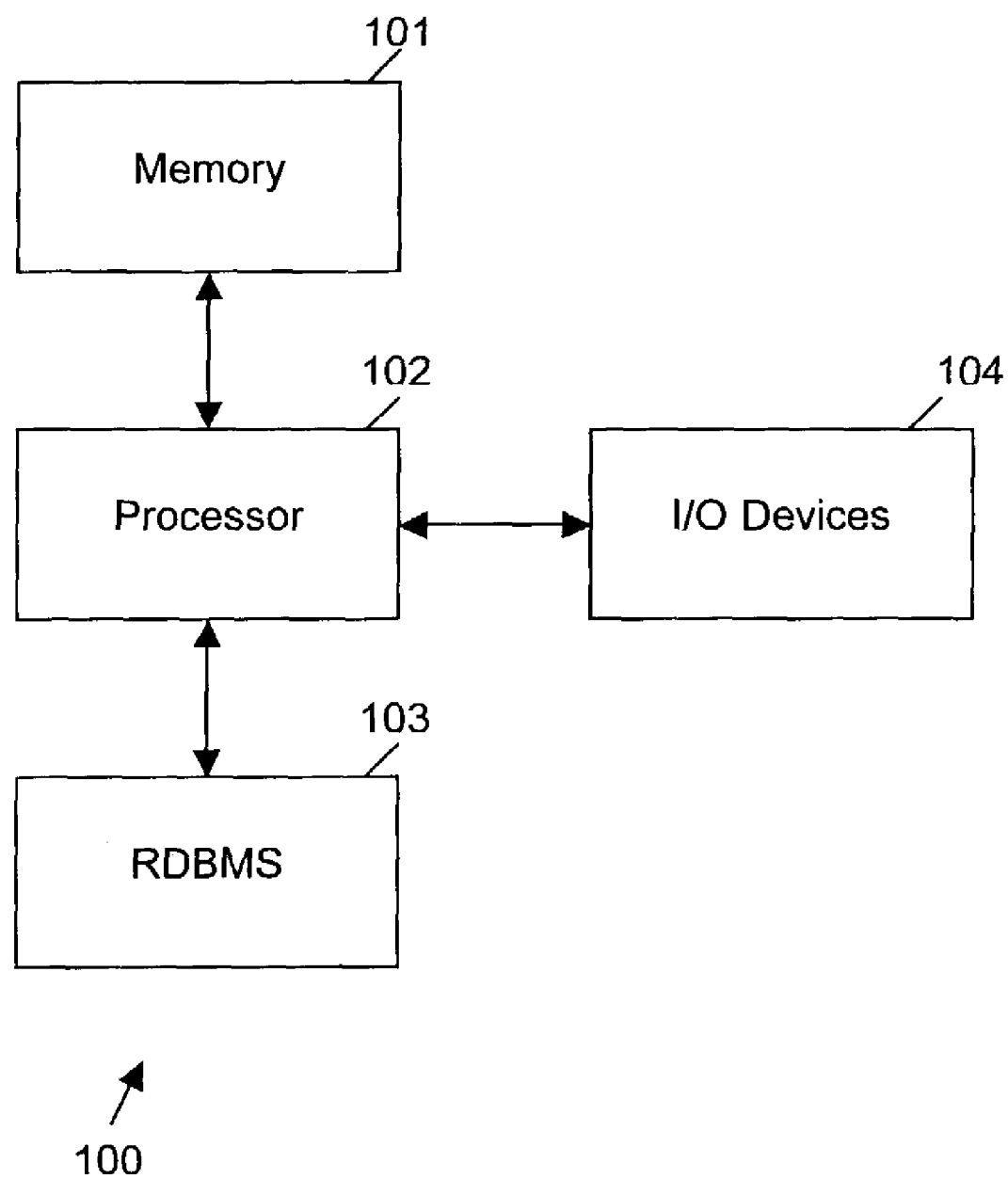
FIG. 1 is a block diagram of an exemplary environment for use with the methodologies of the invention.

An environment for multidimensional disk clustering using a relational database management system (RDBMS) in accordance with an aspect of the invention is described in the context of FIG. 1. The system 100 comprises a processor 102 coupled to a memory 101, one or more input/output (I/O) devices 104, and an RDBMS 103. It is to be appreciated that the processor 102 can implement the aspects or methods of the present invention. Alternatively, the RDBMS 103 may have its own processor, memory, and I/O device configuration (not shown) to implement the aspects or methods of the present invention. In this arrangement, the RDBMS 103 can be hosted on a server platform, for example, and the processor 102, the memory 101, and the I/O devices 104 can be associated with the processor 102 in a client system. Of course, one skilled in the art would readily appreciate that there are many other configurations that may be adapted to process queries using the RDBMS 103 without departing from the spirit and scope of the present invention.

Figure 2:
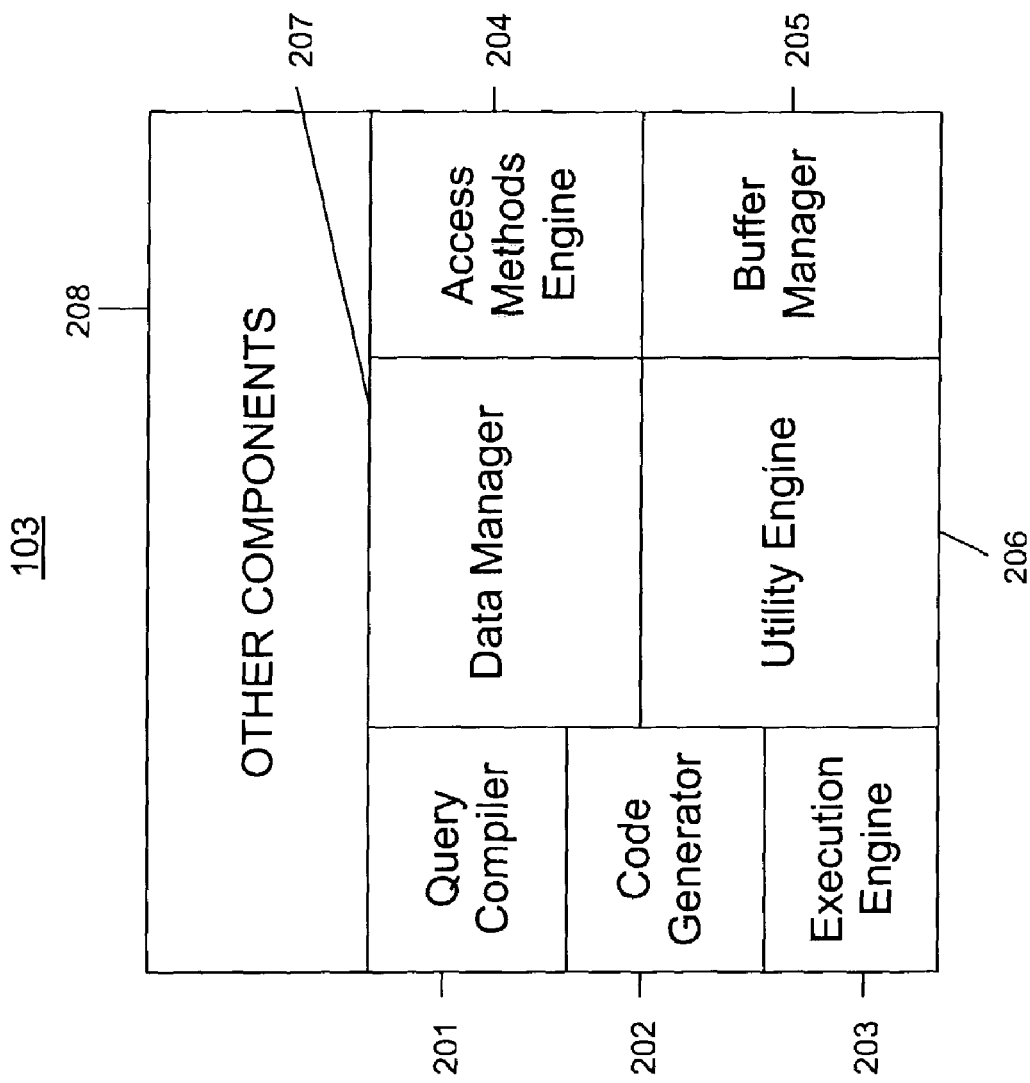
FIG. 2 is a graphical illustration of the exemplary relational database management system of FIG. 1 in accordance with an embodiment of the present invention.

The memory 101 may be used by the processor 102 in performing, for example, storage of information used by the processor 102. The I/O devices 104 may comprise a keyboard, a mouse, and/or any other data input device that permits a user to enter queries and/or other data to the system 100. The I/O devices 104 may also comprise a display, a printer, and/or any other data output device that permits a user to observe results associated with queries and/or other processor operations. The RDBMS 103 may contain system software (such as depicted in FIG. 2) to process structured query language (SQL) commands (or other types of queries), for example, optimizing the SQL commands (or other types of queries) and executing them to obtain information passed back to the processor 102. It is to be understood that the structured data associated with the RDBMS 103 is organized in individual tables, where each table may have a multitude of rows and columns. In a common configuration, an end user using an I/O device 104, such as a standard computer keyboard and/or pointing device, may enter a particular SQL command (or cause the command to be generated). The processor 102 may then receive this command from the I/O device 104 and send it to the RDBMS 103. The RDBMS 103 may then parse the SQL command, optimize the parsed result, and execute it against information associated with the RDBMS 103. The RDBMS 103 may send a result table back to the processor 102 and the processor 102 may then cause the result table to be displayed to the end user associated with the I/O device 104. It should be appreciated, however, that there are many other ways of interacting with the RDBMS 103. For instance, a computer program running in batch mode may interact with the RDBMS 103 without direct user interaction.

It is to be appreciated that the term "processor" as used herein is intended to comprise any processing device, such as, for example, one that comprises a CPU (central processing unit). The term "memory" as used herein is intended to comprise memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to comprise, for example, one or more input devices, e.g., a keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components comprising instructions or code for performing the methodologies of the aspects of the invention, as described herein, may be stored in one or more of the associated memory devices (e.g., ROM, fixed or removable memory) and, when ready to be utilized, loaded in part or in whole (e.g., into RAM) and executed by a CPU.

Those skilled in the art may recognize that the exemplary environment illustrated in FIG. 1 is not intended to limit the present invention. Those skilled in the art may appreciate that other alternative environments may be used without departing from the spirit and scope of the present invention.

FIG. 2 illustrates the exemplary RDBMS 103. The RDBMS 103 has a query compiler 201, a code generator 202, an execution engine 203, an access methods engine 204, a buffer manager 205, a utility engine 206, a data manager 207, and other components 208.

In embodiments of the present invention, the RDBMS 103 comprises the DB2 product offered by International Business Machines Corporation for UNIX, WINDOWS NT, and other systems. It should be appreciated, however, that the aspects of the present invention have application to any relational database software, whether associated with the DB2 product or otherwise.

In operation, the RDBMS 103 executes on a computer system and may communicate with one or more clients using a network interface, for example. It can also operate in a standalone server mode receiving instructions from a user via commands. Typically, the client/user issues SQL commands that are processed by the RDBMS 103 and results are returned. During operation, the query compiler 201 parses the input SQL commands and uses the code generator 202 to generate an execution plan. The parsed SQL commands are typically transformed into an internal representation and are then optimized. Optimization involves looking at several alternative strategies for obtaining the correct result, and choosing the most efficient strategy. The execution engine 203 interprets and executes the plan and produces the desired results. The execution engine 203 submits requests to the data manager 207 to obtain information from tables. This is done in the manner that was determined by the query compiler 201 (or separate optimizer), using available indexes, scanning tables, etc. The execution engine 203 uses the access methods engine 204 to efficiently access the underlying database tables that are stored in the access methods engine 204 (or externally thereto). The relevant data items are then retrieved and stored in the buffer manager 205 for reusability of the data. Typically, relational database management systems provide sequential table scan access as well as index-based access to tables. The B-Tree index is the most preferred index technique in RDBMS 103 systems. Optionally, some RDBMS 103 systems allow that the underlying data be clustered and/or partitioned using one or more columns (or index).

In accordance with the aspects of present invention, the multidimensional clustering technique described herein impacts the following major components of the RDBMS 103:

1) Data Manager 207 and Access Methods Engine 204: Several new data layout and record management structures, along with modifications to the B-Tree index technique for accessing the data are provided. In addition, new techniques for managing concurrent access and recovery of the data structures are supported.

2) Execution Engine 203: New operators for query processing and database maintenance operations to take advantage of the changes to the Data Manager 207 and the Access Methods Engine 204 are provided.

3) Query Compiler 201 and Code Generator 202: New cost-based techniques for choosing between the new operators and existing operators are provided.

4) Utility Engine 206: New schemes to perform utility operations such as bulk loading and data reorganization are provided.

In general, the RDBMS 103 software and the instructions derived therefrom are all tangibly embodied in a computer-readable medium, e.g., a medium that may be read by a computer. The RDBMS 103 software and the instructions derived therefrom are all comprised of instructions that, when read and executed by a computer system, causes the computer system to perform the necessary steps to implement and/or use the aspects of the present invention. Under control of an operating system, the RDBMS 103 software and the instructions derived therefrom may be loaded from an appropriate data storage device and into memory of a computer system for use during actual operations.

Figure 3:
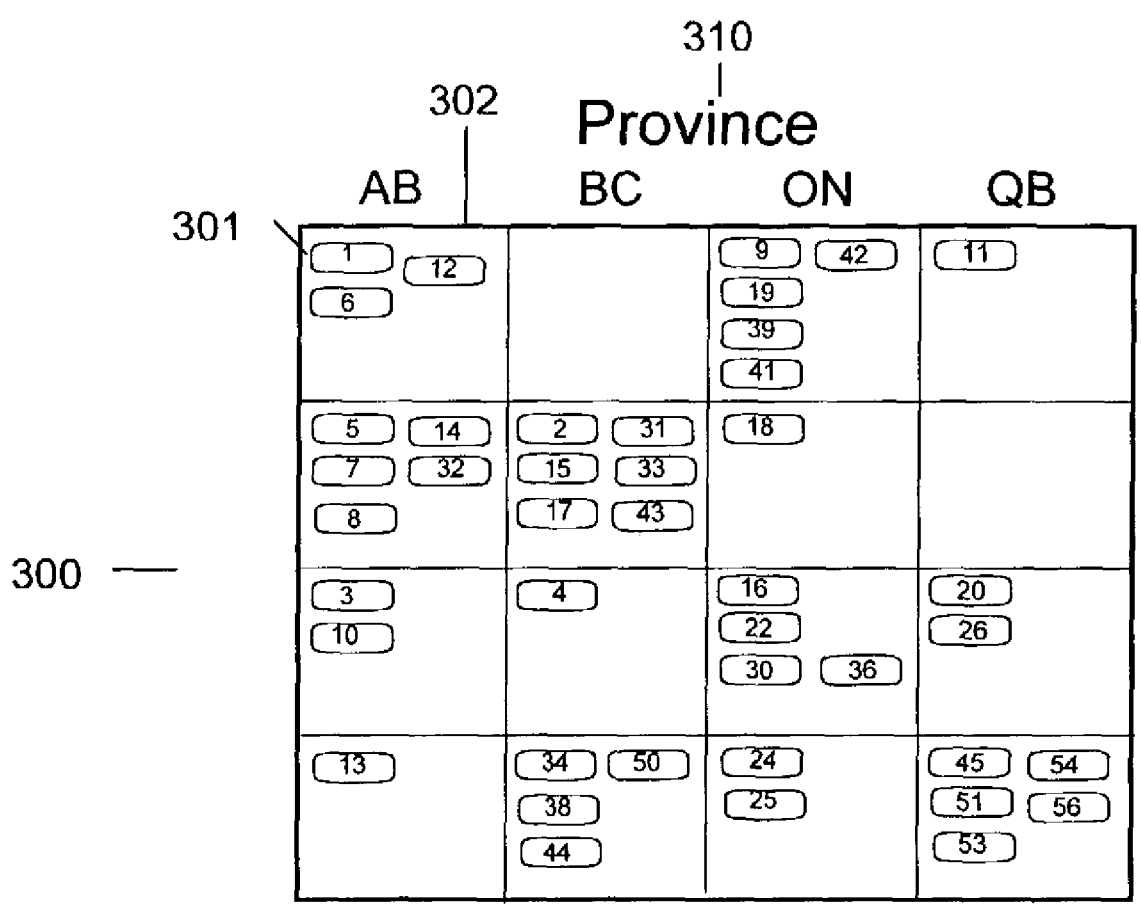
FIG. 3 is a graphical illustration of an exemplary multidimensional table clustered along two dimensions in accordance with an embodiment of the present invention.

FIG. 3 illustrates an exemplary multidimensional table clustered along two dimensions. The multidimensional table shown in FIG. 3 is clustered along dimensions 'YearAndMonth' 300 and 'Province' 310. Records in the table are stored in blocks, which may contain an extent's worth of consecutive pages stored on disk or some other suitable medium. In the diagram, a block is represented by an oval, and is numbered according to the logical order of allocated extents in the table. For example, the oval 301 points to the first block in the table, which is block 1. The grid in the diagram represents the logical partitioning of these blocks, and each square, such as square 302, represents a logical cell. A column or row in the grid represents a slice for a particular dimension. For example, all records containing the value 'ON' (for 'Ontario') in the Province 310 column are found in the blocks contained in a slice defined by the 'ON' column in the grid. In fact, each block in this slice only contains records having 'ON' in the province field. Thus, a block is contained in this slice or column of the grid if and only if it contains records having 'ON' in the province field. In the exemplary multidimensional table depicted in FIG. 3, the slice for the 'ON' province column comprises blocks 9, 16, 18, 19, 22, 24, 25, 30. 36, 39, 41, and 42.

While blocks are numbered sequentially starting from block 1 in the exemplary table shown herein, it should be appreciated that the blocks could be identified in numerous other ways. For instance, the first block in a table could alternatively be labelled as block 0. One skilled in the art would realize that various other ways to identify portions of information related to a table could be devised and different terminology employed without departing from the spirit and scope of the present invention.

Figure 4:
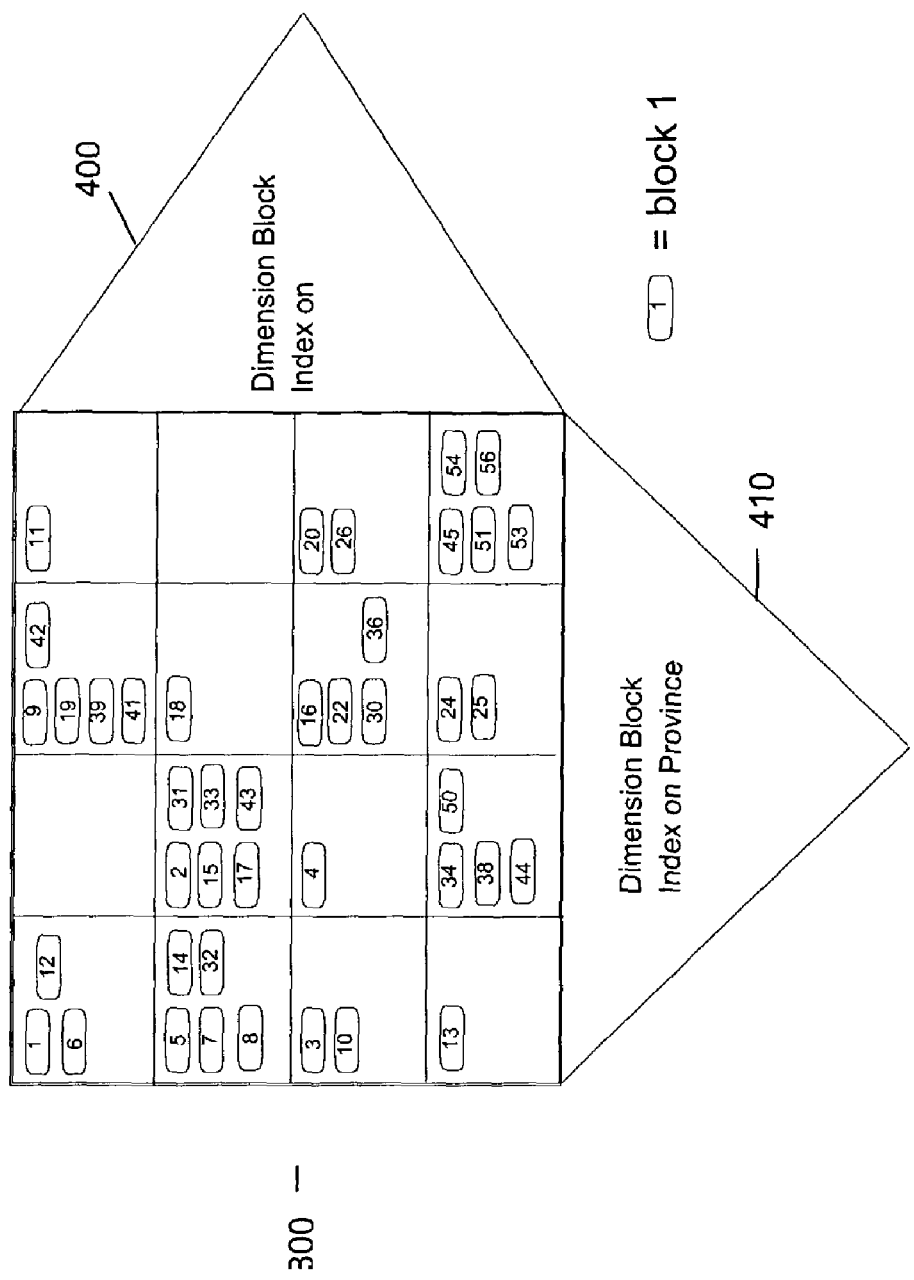
FIG. 4 is a graphical illustration of the exemplary multidimensional table of FIG. 3 with dimensional block indexes on each dimension in accordance with an embodiment of the present invention.

FIG. 4 illustrates the exemplary multidimensional table of FIG. 3 with dimensional block indexes on each dimension. To facilitate the determination of which blocks lie in a slice, or which blocks contain all records having a particular dimension key value, a dimension block index may be automatically created for each dimension when a table is created. Thus, a dimension block index 400 may be created on the YearAndMonth dimension 300, and a dimension block index 410 may be created on the Province dimension 310. Each dimension block index can be structured in the same manner as a traditional record-based index, except that at the leaf level the keys point to a block identifier (BID) instead of a record identifier (RID). Advantageously, since each block contains potentially many pages of records, these block indexes are much smaller than RID indexes and need only be updated as new blocks are required and so added to a cell, or existing blocks are emptied so as to be removed from a cell.

A slice, or the set of blocks containing pages with all records having a particular key value in a dimension, may be represented in the associated dimension block index by a BID list for that key value.

In the exemplary multidimensional table depicted in FIG. 4, the slice containing all records with 'ON' for the Province dimension is found by looking up this key value in the Province dimension block index. A key such as the following is found:

<ON: 9, 16, 18, 19, 22, 24, 25, 30, 36, 39, 41, 42> where the key is in the form of a <key value: BID(s)> pair.

The key comprises a key value, namely 'ON', and a list of BIDs. Each BID contains a block location. In this example, the block numbers listed are the same as those found in the 'ON' column, or slice, that is found in the grid for the multidimensional table. Similarly, the list of blocks containing all records having '9902' for the YearAndMonth dimension is found by looking up this value in the YearAndMonth dimension block index. A key such as the following is found:

<9902: 2, 5, 7, 8, 14, 15, 17, 18, 31, 32, 33, 43>.

The clustering of the table may be specified in the SQL language using an appropriate clause added to the Create Table or Alter Table statements by which the clustering attributes can be specified. For example, the following Create Table statement may be used to create the table in this example.

CREATE TABLE TABLE_1 (Date DATE, Province CHAR(2), YearAndMonth INTEGER
ORGANIZE BY_DIMENSIONS (YearAndMonth, Province);

In this case, the dimensions YearAndMonth and Province were defined for table TABLE_1 using the DIMENSIONS clause. The clustering of the table should be enforced on all the data in the table. In particular, if the clustering is specified using the Alter Table command on an existing table, this may require a reorganization of the data to be performed as well. The block indexes can be created for the clustering attributes automatically.

FIG. 5 illustrates a data structure for an exemplary composite dimension index. When a record is inserted into a table, it should be determined whether a cell already exists for its dimension values. If one does, the record may be inserted into an existing block of that cell if possible, or another block may be added to that cell if the current blocks are full. If the cell doesn't yet exist, a new cell may be created and a block added to it. This automatic maintenance may be implemented with an additional block index, called a composite dimension index, and can be created when the multidimensional table is created. This composite dimension index may be on all the dimension columns of the table, so that each key value corresponds to a particular cell in the table and its BID list of blocks comprising that cell. This is shown in FIG. 5. This composite block index assists in quickly and efficiently finding those blocks having a particular set of values for their dimensions. It may also be used to dynamically and efficiently manage and maintain the physical clustering of data along the dimensions of the table during an insert operation. It should be appreciated that multidimensional index structures such as R-trees could also be used to implement a composite dimension index if they were to point to blocks rather than records or objects.

Figure 6:
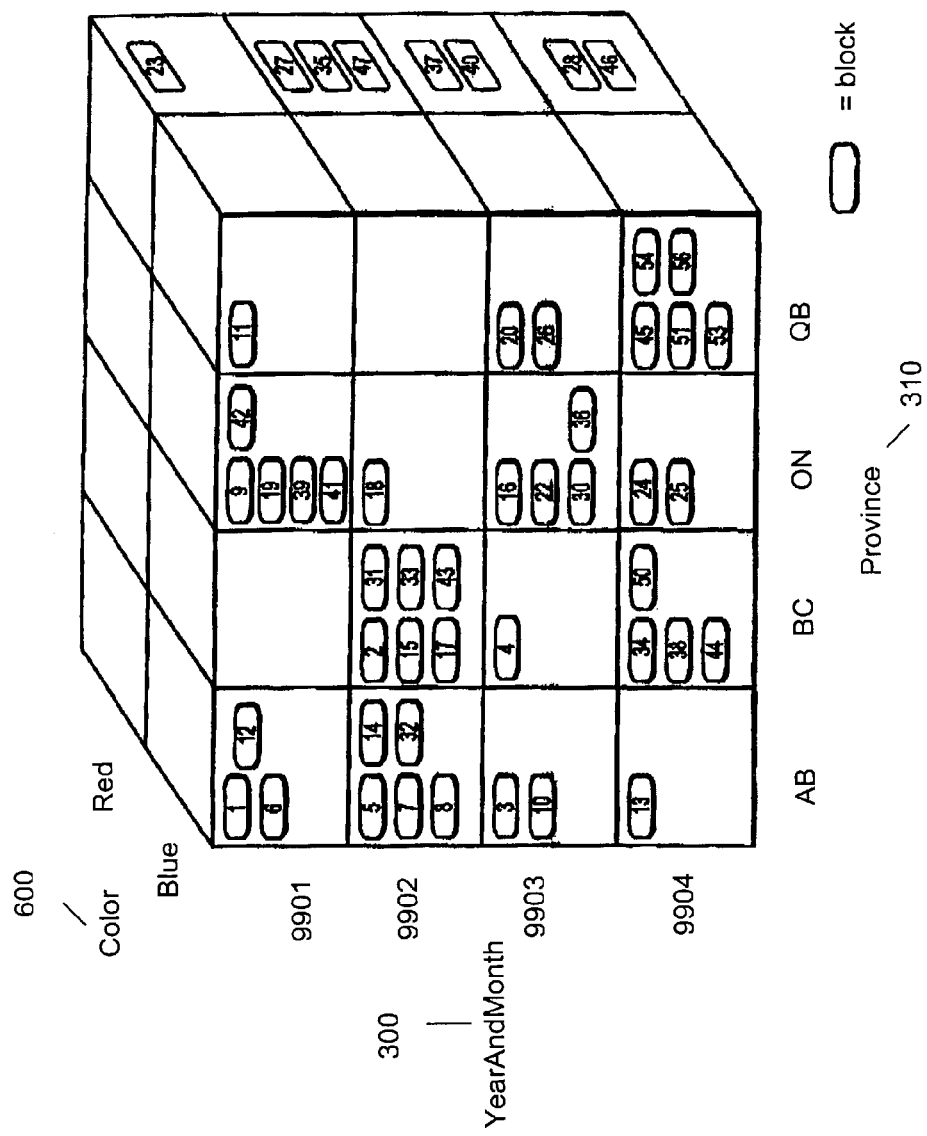
FIG. 6 is a graphical illustration of the exemplary multidimensional table of FIG. 3 extended to a third dimension in accordance with an embodiment of the present invention.

FIG. 6 illustrates an extension of the table of FIG. 4 that comprises an additional dimension. For example, a multidimensional table can be dimensioned on the YearAndMonth dimension 300, the Province dimension 310, and a Color dimension 600, as shown in FIG. 6. This configuration can be envisioned as a logical cube. In this example, four block indexes would be created: one for each of the individual dimensions, i.e., the YearAndMonth dimension 300, the Province dimension 310, and the Color dimension 400; and a composite dimension index (not shown) with all of these dimension columns as a key.

One of the goals of the above-described multidimensional table structure is to facilitate efficient query processing; these query processing methods may be facilitated by the aspects of present invention. Consider the three-dimensional cube shown in FIG. 6, which is dimensioned along the YearAndMonth dimension 300, the Province dimension 310, and the Color dimension 600. A query such as the following: "What is the aggregate sales of Color='Red' over all dates and regions?" could be processed in several different ways. The choices for processing this query comprise:

Table Scan: Scan the entire table and only select the rows with Color='Red'.

Block Scan: Use the block index on Color to narrow down the search to a specific set of blocks.

Record Scan: Use a record-based index on Color (if it exists) to narrow down the search to a specific set of records.

The query optimizer can use a cost model to find the best of these choices. The block scan method is an operation that is introduced in this aspect of the invention. This block scan operation proceeds in the following steps: scan the block index to find block identifiers that satisfy the query predicate, and process all the records in the block. This might involve additional predicates. The block scan operation is most effective when most of a block or sets of blocks or records need to be processed for a given query. Such requirements are fairly typical in data warehouses. For example, the above query is very likely to involve access to a whole set of blocks. Thus, the block scan operation is likely to be the most efficient method of processing this query.

RID indexes may also be supported for multidimensional tables, and RID and block indexes can be combined by index ANDing and index ORing techniques. Multidimensional tables are otherwise treated like any existing table. For instance, triggers, referential integrity, views, and automatic summary tables can be defined upon them.

Figure 7C:
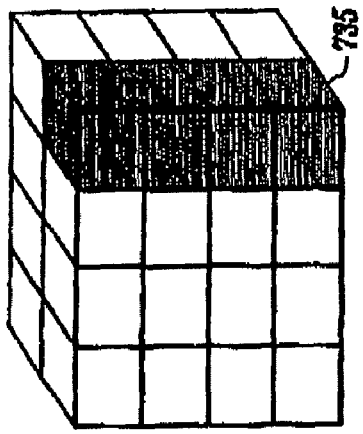
FIGS. 7(a), (b), and (c) are graphical illustrations of an index ANDing technique in accordance with an embodiment of the present invention.
Figure 7B:
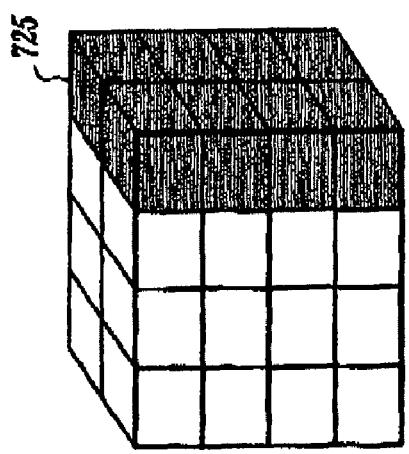
Figure 7A:
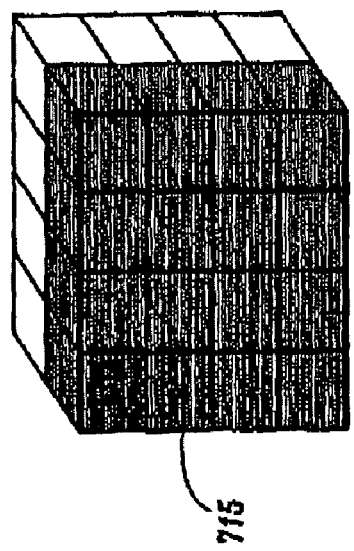

FIG. 7(a)-(c) illustrates how index ANDing may be accomplished using block indexes. Consider a query against the three-dimensional cube shown in FIG. 6 for Color='Blue' and Province="QB". The slice containing all blocks with Color='Blue' is determined by looking up the 'Blue' key value in the Color dimension block index associated with the table. A key is found such as <Blue: 1, 2, 3, 4, 5, 6, 7, 8. 9, 10, 11, 12, 13, 14> corresponding to slice 715 shown in the cube diagram of FIG. 7(a) (highlighted in grey).

The blocks containing all records having Province='QB' are then determined by looking up the 'QB' key in the Province dimension block index, finding a key such as <QB: 11, 12, 13, 14, 27, 28, 35, 37, 40, 51> corresponding to slice 725 shown in the cube diagram of FIG. 7(b). To find the set of blocks containing all records having both values, the intersection of these two slices should be found. This is done by index ANDing the two BID lists. In this example, the common BID values are 11, 12, 13, and 14, corresponding to section 735 of the cube diagram shown in FIG. 7(c).

Once have a list of blocks to scan is found, a mini-relational scan can be performed on each block. This would involve just one I/O device 104 as a block is stored as an extent on disk and can be read into the bufferpool as a unit. If the query predicates need to be reapplied and some of the predicates are only on dimension values, these predicates need only be reapplied on one record in the block since all records in the block are guaranteed to have the same dimension key values. If other predicates are present, these predicates need only be checked on the remaining records in the block.

The block-based index ANDing scheme is very efficient since a bit map scheme can be used. In addition, the processing time for index ANDing is significantly less since the block-level indexes are smaller than the RID indexes. Finally, the intersecting list of blocks is accessed efficiently using block-based I/O operations. Overall, the operation is extremely efficient and should be significantly faster than existing alternatives prior to this technique.

Conventional RID-based indexes are also supported for multidimensional tables, and RID and block indexes can be combined by index ANDing and ORing.

As mentioned, a block-based index ORing operation may also be performed using block indexes. For example, if the query comprises the condition Province='ON' or Province='BC', then the province block index can be scanned for each category and an aggregated list of blocks can be obtained by an ORing operation. The ORing operation can eliminate duplicate BIDs which are possible for conditions such as Province='AB' or Color='Red'.

A secondary block index scan can also be supported. Given a secondary block index, a single BID can appear under numerous keys. This is typically not possible in a RID index. When a secondary block index is used to access a fact table, a qualifying block should be scanned just once. All records from a qualifying block should be accessed on that scan and the block should not be fetched again. This requires that the qualifying list of blocks be maintained so duplicates can be eliminated.

Figure 8:
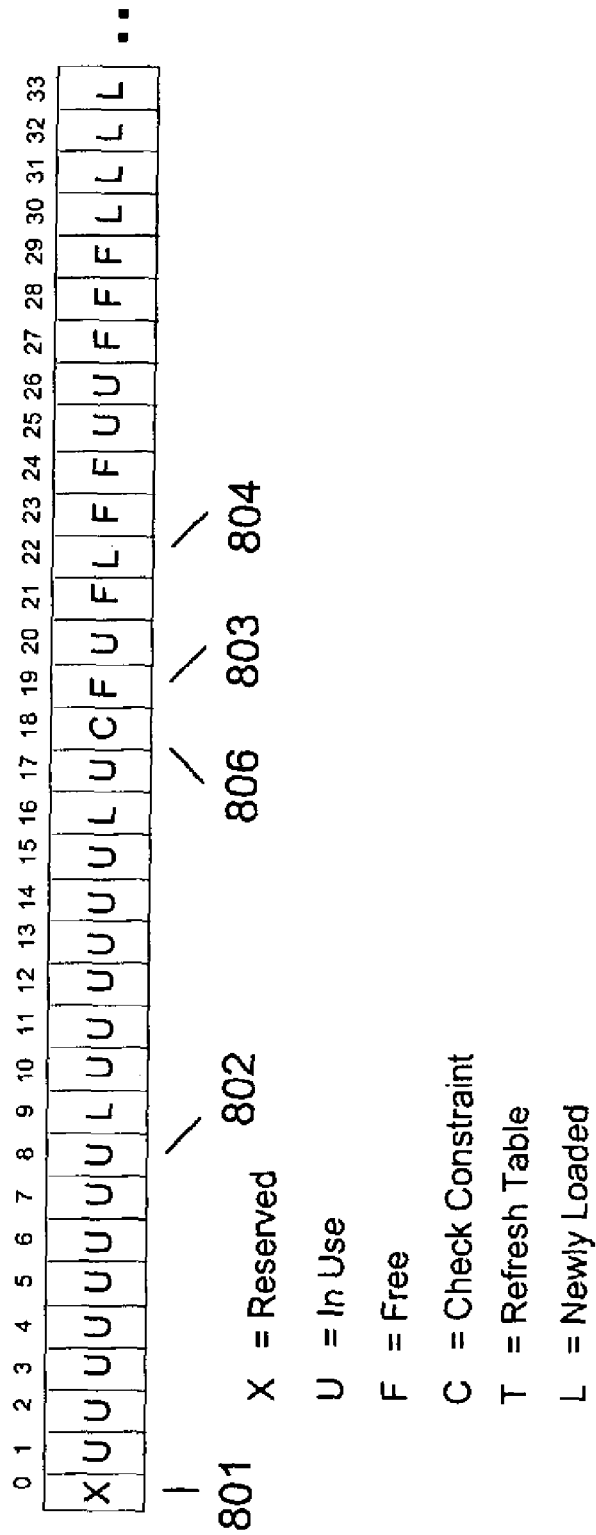
FIG. 8 is a graphical illustration of an exemplary block map in accordance with an embodiment of the present invention.

FIG. 8 illustrates an exemplary block map associated with a multidimensional table. The block map records the current state of each block belonging to a particular table. For example, element 801 in this block map represents block 0 in a multidimensional table. Its availability status is 'X' indicating that it is reserved; it may never be used to store data rows of the table. Element 802 in the block map represents block 8. Its availability status is 'U' indicating that it is in use. Similarly, blocks 1-7, 10-15, 17, 20, 25, and 26 are also in use. This means that the blocks are currently assigned to cells and records may be found in them. Element 803 in the block map represents block 19. Its availability status is 'F' indicating that the block is free. Similarly, blocks 21, 23, 24, and 27-29 are also free. This means that these blocks are not currently being used by the table and are available. Element 804 in the block map represents block 22, and its availability status is 'L' indicating that the block has recently been loaded with information. Similarly, blocks 9, 16, and 30-33 are also recently loaded blocks. Element 806 in the block map represents block 18. Its availability status is 'C'. Block 18 was previously loaded and still needs constraint checking.

It should be appreciated that the block map shown in FIG. 8 contains various status flags having particular values but that other values could also be used to reflect different or additional block statuses. Furthermore, it should be appreciated that the bit map data structure may be constructed in such a way that additional elements representing additional blocks or other information may be dynamically allocated.

Each block may have a header, located in a first slot of the block's first page which stores a structure comprising, among other possible things, a copy of the block status so that the block map can be re-created if necessary in case of deletion or corruption of the map. In addition, the structure comprises a bit map covering the pages of the block, indicating which pages are empty (e.g., 0=empty, 1=nonempty, even if it contains only overflow or pointer records). Each block may also have an associated free space control record (FSCR) that could contain page offsets and approximations of free space per page. These FSCR's may be located on the first page of a block and stored as the second record on this page, for example.

The above-mentioned organization of a table is space efficient. The multidimensional keys and a corresponding block size should be chosen so that each cell may have one or more blocks of data. Only the last block is likely to be partially full. This highly efficient state can be maintained even in the presence of frequent insert and delete operations or background reorganization. In contrast, OLAP organizations may lead to quite a bit of unused space as has been discussed previously.

Figure 9:
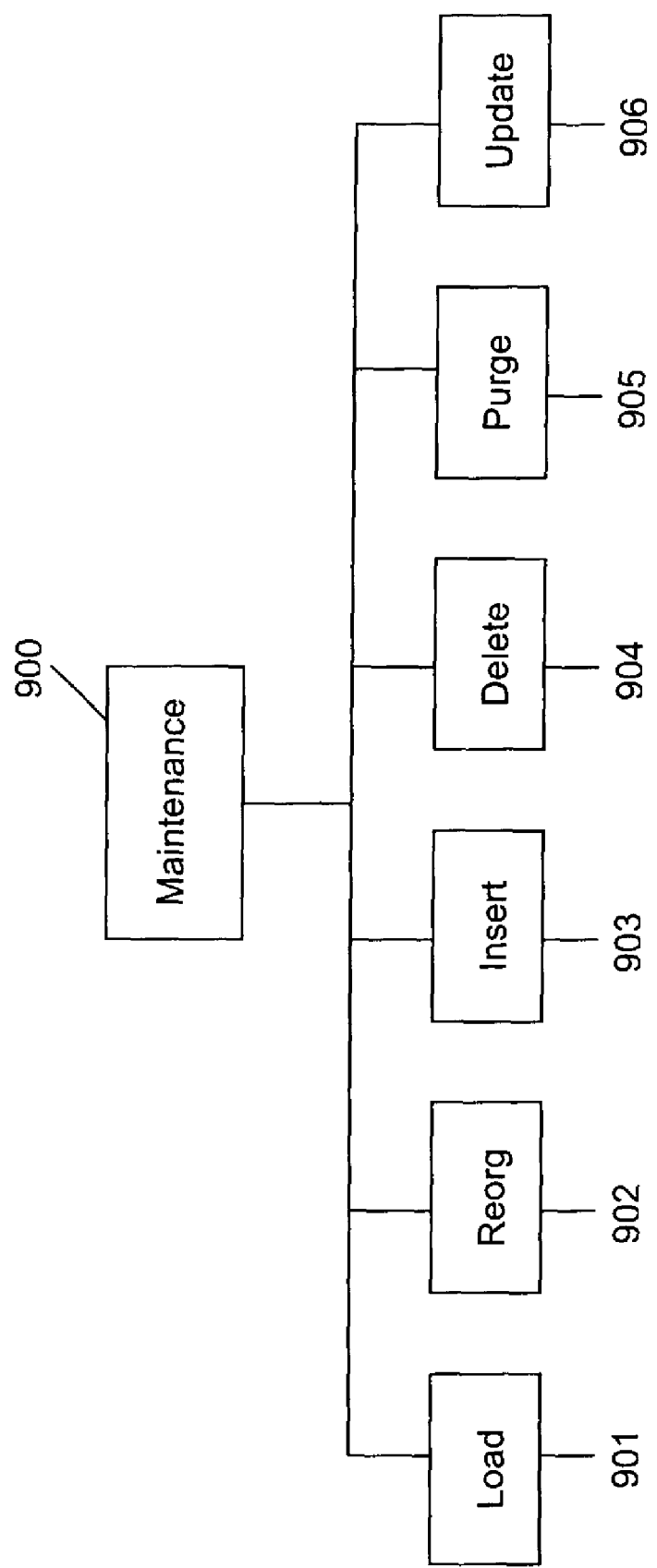
FIG. 9 is a graphical illustration of various exemplary maintenance functions in accordance with an embodiment of the present invention.

FIG. 9 illustrates various maintenance functions that can be performed in accordance with the techniques of the aspects of the present invention. FIG. 9 comprises a maintenance function 900 that comprises a load function 901, a reorganization ("reorg") function 902, an insert function 903, a delete function 904, a purge function 905, and an update function 906. These will now be described in detail.

Load Function 901

A load function 901 (alternately referenced as load utility 901) is typically used to load relatively large amounts of data into a table rather than issuing numerous insert commands. The load utility 901 can access a data set formatted in a particular manner, and use the information in the data set to create rows in a particular table.

It is important that the load utility 901 employ an efficient scheme to insert data into a table. Loading data into a multidimensional table may be advantageously accomplished by organizing the input along dimension values. (This may be established as the default for multidimensional tables). This is necessary in order to ensure that records are clustered appropriately along dimension values and block boundaries. For example, a bin can be created for the logical cell corresponding to <YearAndMonth=9903, Province='ON', Color='Red'>. All records with similar values of the dimension attributes can be assigned to this bin. Physically, each bin can be represented by a block of data pages. Recently processed bins can be maintained in memory 101 and written to disk when they become full or if there is a need to bring other bins into memory 101.

One method to reduce processing is to allow users to specify a clause in their LOAD command, such as, for example, a MODIFY BY ASSERTORDER clause. This optional clause (or one similar that produces the same effect) can be used to inform the load utility 901 that the input data set is already in sorted order and hence the processing can be done more efficiently. This is useful in several instances, for example, allowing the load utility 901 to merely verify the order when the data is already sorted on dimension and key value. As another example, this optional clause is useful when loading records for a particular cell and thus all dimension values are the same for the records added. This may be the case, for instance, when a table has a single dimension and the user is rolling in records having a particular value for that dimension (e.g., all records from February, 2001). If the MODIFY BY ASSERTORDER clause (or one similar that produces the same effect) is specified, the load utility 901 can be configured to verify that the data is properly ordered. In the event that the load utility 901 encounters a record out of sequence, the load can cease processing, leaving the table in a load pending state, for example.

Reorganization Function 902

Reorganization functions 902 (alternately referenced as reorganization utilities 902) are used to rearrange the physical layout of the data in a database. Reorganization (or "reorg") of a database may be needed to release fragmented data space or to rearrange (cluster) records having a cluster index.

Reorganization of a multidimensional table is much simpler and is required less often than for a table with a clustering index. Since clustering can be automatically and continuously maintained in multidimensional tables, reorganization would no longer be required to recluster data. The reorganization utility 902 can still be used, however, to reclaim space in a table (specifically, to reclaim space within cells) and to clean up overflow records. The reorganization utility 902 for a multidimensional table is block-oriented. The composite dimension block index can be used to access records of particular blocks. The records can be rearranged into a new block using reorganization parameters such as, for example, an amount of free space needed. It is possible that the initial logical cell might contain many blocks while the rearranged cell might contain fewer blocks. For example, initially, a cell might contain blocks 1, 10, 30, and 45. After reorganization, the cell might contain only new blocks 1 and 2. The rest of the space would have been released for use by other cells or completely freed up from this table. A new block map may also be reconstructed at the end of the reorganization.

Insert Function 903

The insert function 903 (alternately referenced as insert operation 903) involves creating new records in a table. Clustering should be maintained during an insert operation 903. Suppose a record is to be inserted with dimension values <9903, 'AB'> into a multidimensional table (such as the one depicted in FIG. 4). The appropriate block for this new record is identified by using a composite block index. The key value 9903, AB is looked up in the composite block index (such as is depicted in FIG. 5), finding a key such as:

<9903, AB: 3, 10>

In this case, two blocks 3 and 10 are found with this key value. These blocks contain all the records—and only those—that have the dimensions specified. The new record is inserted in one of these blocks if there is space on any of their pages. If there is no space on any pages in these blocks, a new block is allocated to the table or a previously emptied block in the table is used. A block map (such as is depicted in FIG. 8) can be searched to find a free block. For example, after consulting the block map for the table, it is determined that block 48 is currently not in use by the table (e.g., its status is 'F' indicating it is free). In this case, the block's status is set to "in use" in the block map, the record is inserted on a page of block 48, and this block is assigned to the cell by adding its BID to the composite block index and to each of the dimension block indexes.

When a record is inserted into a new block in the table, that block is added to the appropriate cell by inserting its BID into each of the above-mentioned block indices and into the composite block index. This effectively associates this block with a particular cell, or set of dimension key values, in the table.

After addition of block 48, keys in the dimension block indices (FIG. 6) have the following values:

<9903: 3, 4, 10, 16, 20, 22, 26, 30, 36, 48>
<AB: 1, 3, 5, 6, 7, 8, 10, 12, 14, 32, 48> and the resulting keys in the composite block index would be

<9903, AB: 3, 10, 48>.

If were no more free blocks in the table a new block would be allocated for the table, and used to insert the record. The indexes would be updated as shown above in that case as well.

If a record with new dimension values is inserted, then a new block or free block should be allocated. The block would be set to "in use" in the block map, and its new key values would be added to the dimension and composite block indexes.

When performing the insert function 903, special attention should be paid to the insert of the first record in a block as well as the first record to a new page in a block. A page bit map for each block can be used to maintain the state of the pages in the block. A bit in the page bit map can be set when the first record is inserted into the page. This bit map enables tracking of the occupancy of pages in a block and helps to maintain the state of the block in the presence of inserts and delete operations.

Delete Function 904

Blocks should be managed in such a way that a block can belong to a particular cell when it contains data having values of that cell, but can also be disassociated from any particular cell when the block is empty and contains no records. In this way, blocks can be reused for different cell values after they have been emptied of data.

Technically, a delete function 904 (alternately referenced as delete operation 904) deletes one or more records in a table and frees up the space occupied by these records. Deletion of a multidimensional table also does the same thing. However, special attention is given to the state of pages in a block and the entire block as well. If the last record of a page is deleted, then the page bit map is updated to clear the bit associated with the particular page. When all pages in a block are empty, this page bit map is fully cleared and this may indicate that the block can be marked free in the block map. This free block can be reused by future insert and load operations, for example. When a block is freed, all the dimension indexes should also be updated and the BID removed that is associated with the freed block from particular key(s) corresponding to the dimension attributes for the block. Specifically, when the last record is deleted from a block, this block can be disassociated from the cell to which it formerly belonged. Such a block can be reused for any cell that needs it, regardless of the cell's dimension values. An empty block is disassociated from a cell by removing the BID from each of the block indices and setting the block map bit for this block to FREE.

Purge Function 905

The purge function 905 (alternately referenced as purge 905) is a special form of the delete operation 904 when a large set of related records are deleted. Consider the following SQL statement:

Delete from Table_1 where color='Red';

Assume that the color attribute is a dimension of this table (such as is the case for the table depicted in FIG. 6). Hence, the constraint color 'Red' indicates that all blocks associated with the 'Red' value are to be deleted. This could be accomplished by looking up the dimension block index of color for 'Red' and finding a list of associated BIDs. Suppose this list was 12, 17, 21, and 30. If there were no other indexes or related data structures on this table, these blocks could be marked as free in the block map for the table and the BIDs could be deleted from the block indexes. This would be an extremely fast operation and would reduce the logging and index maintenance costs as well.

It is possible to detect that a purge 905 style of delete is applicable by examining the delete statement and verifying that the constraint is based on one or more dimension clauses. In particular, if one or more block indexes are used to identify the set of BIDs that need to be processed, purge 905 style of delete can be used. The optimizer can detect this and generate a suitable query plan accordingly. The optimizer may also have knowledge of the additional issues that may enable or disable a fast purge 905. These issues comprise presence of additional indexes and constraints on the table.

Update Function 906

The update function 906 (alternately referenced as update operation 905 or update 906) involves modifying information in a table. In a multidimensional table, the updates 906 are comprised of these kinds:

Simple update 906: In this case, the update 906 applies only to attributes or fields of the table that are not dimensions. Hence, the record continues to belong to the same logical cell. It may reside in the same location if the changes do not require additional space. Otherwise, it could move to a new location in the same block or to another block. When moving this record, the original location's RID is maintained; the new location is referenced by a pointer using the overflow pointer technique. If the new location is a new block, the new block may be inserted in the dimension block indexes.

Update 906 of the dimension column(s): If the update 906 is to one or more dimension columns, it would be possible to treat this as a delete and an insert, internally. This may ensure that the record is now clustered in the new cell since it cannot be located in a block belonging to the old cell. The techniques described above for delete and insert are combined in order to perform this operation.

Slice update 906: If the update 906 is to one or more dimension columns, and all the rows of one or more qualifying slices are to be updated to the same new values of the dimension columns, then the update 906 can be performed in the standard way, as in the simple update 906 case. There is no need for the rows to be deleted and inserted.

Rendering the Insert Function 903 More Efficient

It is highly desirable that the insert function 903 minimize the number of blocks searched in a cell before finding space to insert new records in a table.

To minimize the number of blocks searched for insert 903, a bit is associated with each BID in the composite dimension block index. If a BID has been previously searched and found not to have space for the record being inserted at that time, then the bit for this BID is set to indicate this. This bit then provides a hint to subsequent inserters as to whether or not a block is likely to have space in it. When scanning the BIDs for a particular cell, up to two passes of the BID list may be performed. On the first pass, BIDs having the full bit set are skipped and only those with it unset are actually searched. If no space for the record is found in a searched block, then the bit for that BID is set on return to the index scan, and the scan is resumed from where it left off. If the entire BID list is scanned and no space has been found, the BID list is scanned a second time. This is done since the bit is used only as a hint, and all relevant existing blocks should be searched before physically allocating a new block to the table. On the second pass, any blocks that were not searched in the first pass would be visited. For these BIDs, the full bit is first unset and the block searched. Then, if there is insufficient space in the block for the record, the bit is set again. This two-pass technique ensures that the entire cell is searched for space before adding a new block to the cell. At the same time, however, those blocks that have been determined to have had insufficient space in the past are not searched until last.

Referring to FIG. 10, there is illustrated in a flowchart 1000 a method of searching blocks in a cell for space in which to insert a record. In step 1002, the composite block index is first searched for the key having the dimension values of the record to be inserted. If the key is not found in the dimension block index, then query 1004 returns the answer NO and the method proceeds to step 1036, in which the search is ended, a new cell for these dimension values is assigned, and the record is inserted into a block assigned to this new cell. If the key searched for in step 1002 is found, then query 1004 returns the answer YES and the method proceeds to step 1006.

In step 1006, the method checks the first BID in the list to determine if its full bit is set or not. If its full bit is set, then the method proceeds to step 1018 in which the next BID in the list is considered. If, on the other hand, query 1008 returns the answer NO, in that the full bit is not set for this BID, then the method proceeds to step 1010 and the block designated by the BID is searched for space to store the record. If there is sufficient space on the block to store the record, then query 1012 returns the answer YES and the method proceeds to step 1014 in which the record is inserted on the block and then terminates. If query 1012 returns the answer NO, in that there is insufficient space on the block to store the record, then the method proceeds to step 1016, in which the full bit is set for the BID for this block and this BID is added to a list in memory 101 of those BIDs that have been searched on this first pass and found to be full. The method then proceeds to step 1018 in which the next BID is considered.

The method then proceeds to query 1020, which queries whether the end of the BID list has been reached. If query 1020 returns the answer NO, then the method returns to query 1008. If, on the other hand, query 1020 returns the answer YES, then the method proceeds to step 1022 (FIG. 10B) and returns to the start of the BID list again for a second pass. In the second pass, blocks that were skipped in the first pass are checked to determine if any space has been freed up since the full bit had been set. Query 1024 queries whether the block has been searched already. If query 1024 returns the answer YES (that is, if this block was searched on the first pass) then the method proceeds to step 1032 and moves to the next BID on the list. If query 1024 returns the answer NO, then the method proceeds to step 1026. In step 1026, the full bit for the BID is unset and the block is searched for space on which to insert the record. If space is found in the block, then query 1028 returns the answer YES, and the method proceeds to step 1014 (FIG. 10A), in which the record is inserted in the block.

If there is insufficient or no space in the block, then query 1028 returns the answer NO and proceeds to step 1030. In step 1030 the full bit for this block is set once again before the method moves on to step 1032 in which the next BID on the list is searched. The method next proceeds to query 1034, which queries whether the end of the BID list has been reached. If query 1034 returns the answer NO, then the method returns to the query 1024. If, on the other hand, the end of the BID list has been reached, then query 1034 returns the answer YES, and in step 1036 a new block is provided in which the record is inserted.

Minimize Number of Page Accesses when Searching a Block For Space

When searching a block for space to insert a particular record, it is desirable to access as few pages as possible. A free space control record (FSCR) is used for this purpose. The first page of each block contains an FSCR, which stores the approximate available space for each page in that block. By fixing the first page of the block, space information for the pages of the block can be scanned to find a page having space for the record. Only those entries for pages that could have space for the record are then accessed.

FSCRs are used in relational database management systems, and have very efficient free space search algorithms. For non-MDC tables, these records are interspersed through the table and can be found on every Nth page of the table, such that each one maps an array element to each of the N pages comprising and following the page that it is on. In MDC tables, an FSCR is stored in every block, and so on every M pages, where M is the block size. Since the blocks that are to be searched are determined using the composite block index described above, only those FSCRs relevant to the insert are searched.

Figure 10A:
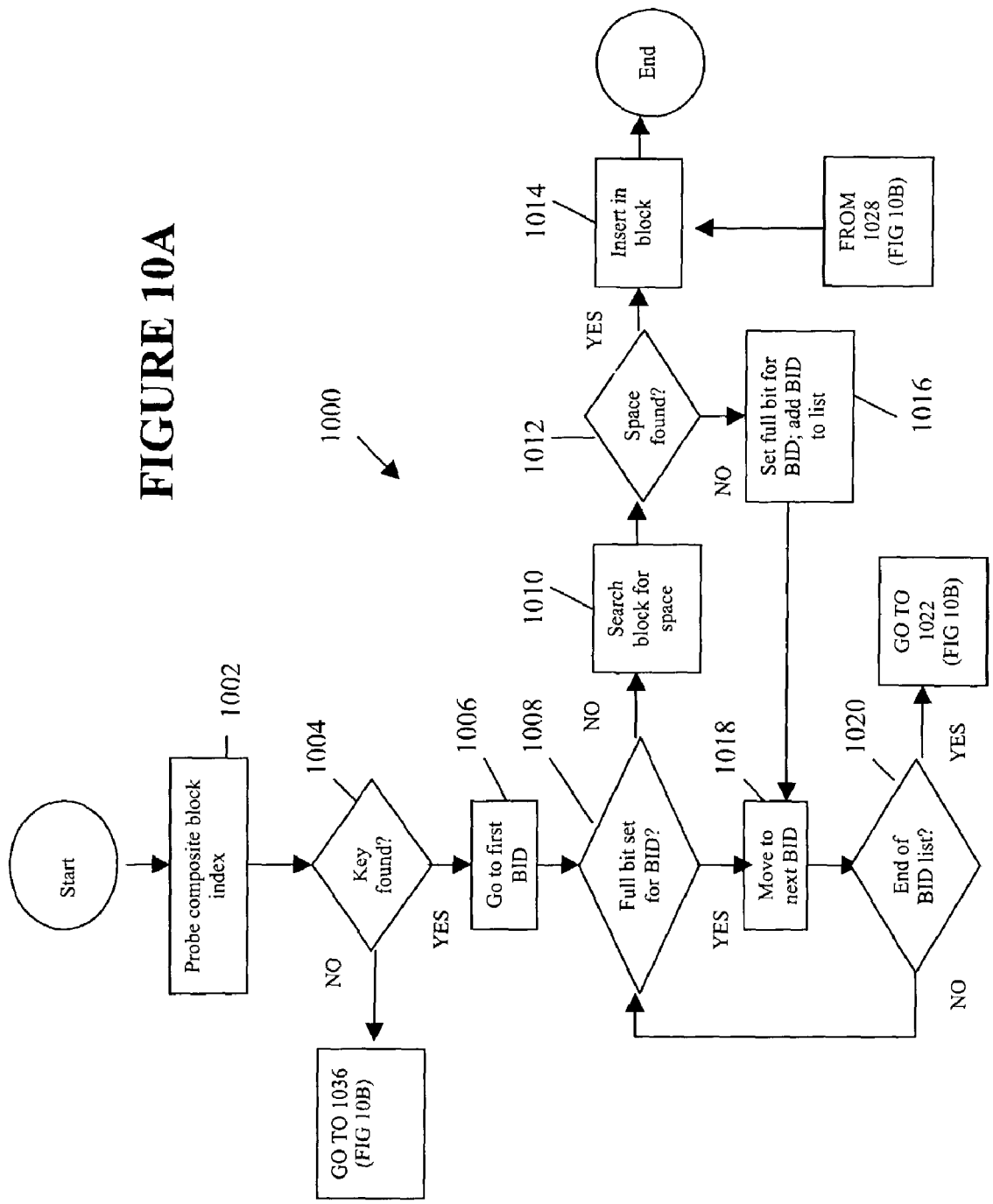
FIGS. 10A, 10B are flowcharts of a method of searching blocks in a cell for space in which to insert a record in accordance with a further aspect of the present invention.
Figure 10B:
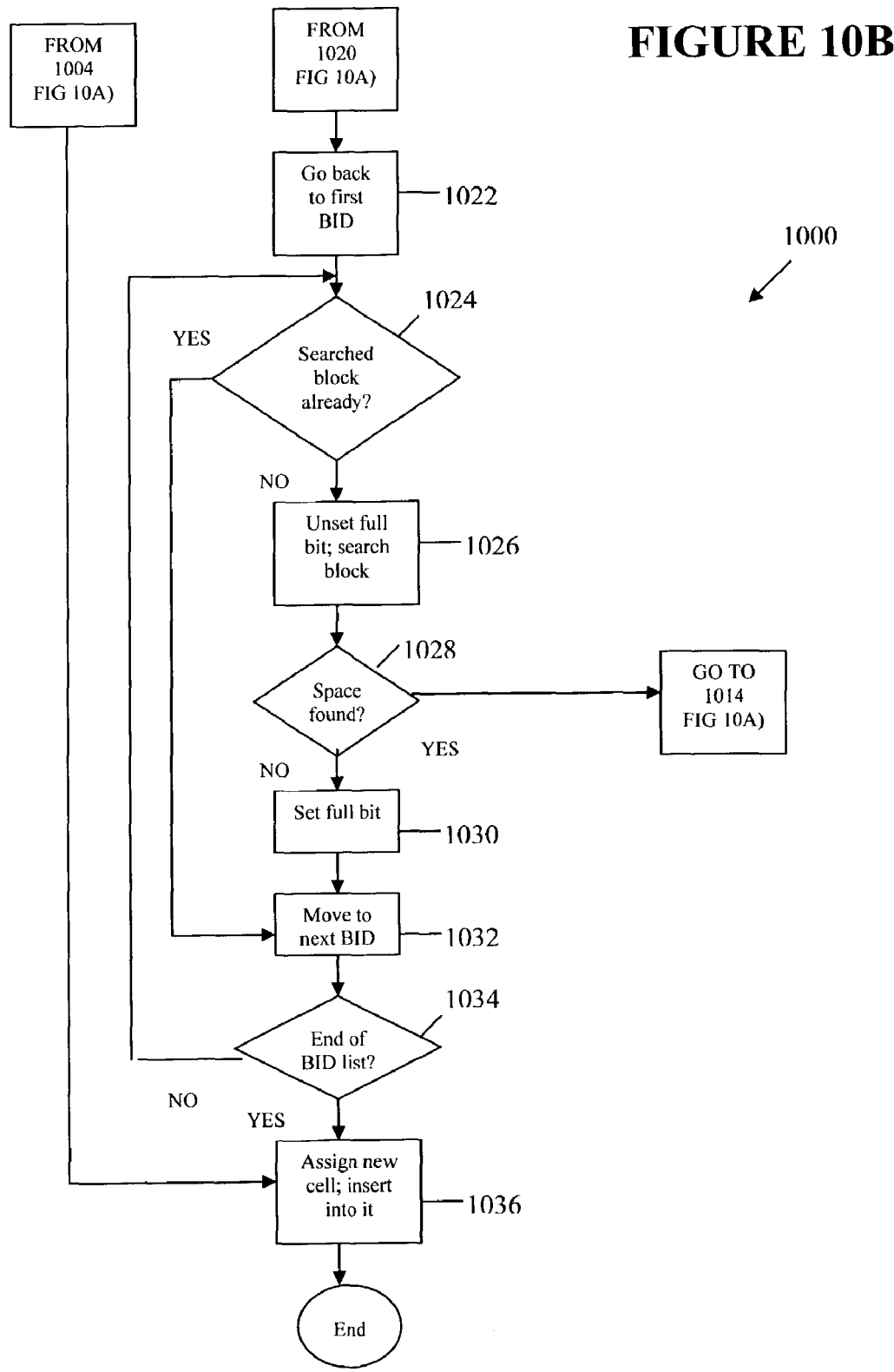
Figure 11:
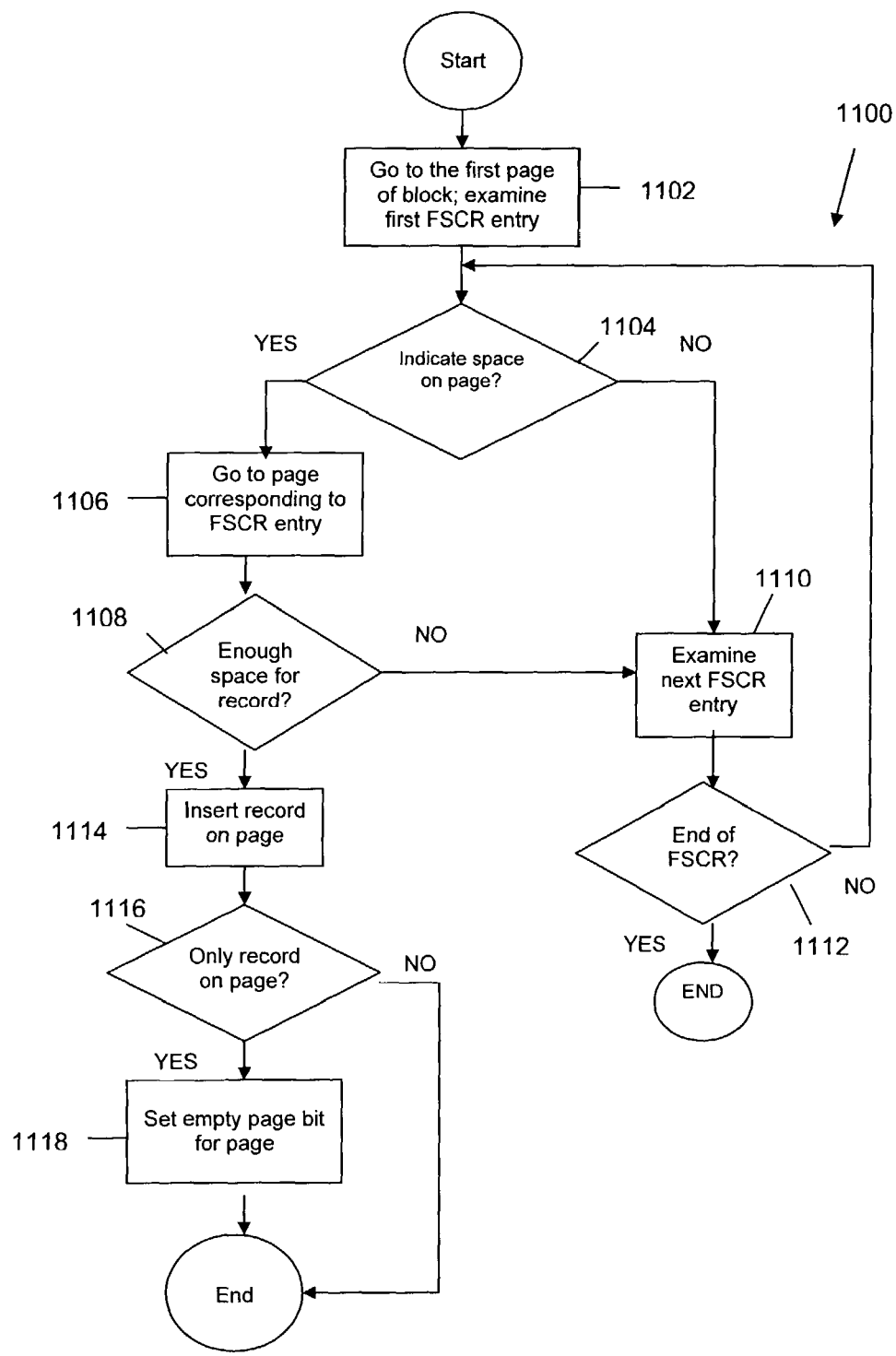
FIG. 11 is a flowchart illustrating a method of searching a block for storage space in accordance with an aspect of the invention.

Referring to FIG. 11, step 1010 of FIG. 10A in which a block is searched for storage space is broken down into a series of steps. When a BID is found in the composite block index, the next step is to determine whether the block associated with that BID contains space for the record to be inserted. To determine if this is the case, in step 1102 the method 1100 proceeds to the first page of the block and examines the first entry of the FSCR record on that page. If the FSCR indicates that there is likely to be enough space on that page, then query 1104 returns the answer YES and the method goes to the page corresponding to the FSCR entry in step 1106. If there is in fact enough space for the record on this page, then step 1108 returns the answer YES and the method proceeds to step 1114. If there is not in fact enough space on this page, then query 1108 returns the answer NO and the method goes to step 1110. Similarly, if query 1104 had returned the answer NO, i.e., the FSCR entry did not indicate that there was enough space on the page, then the method would have proceeded directly to step 1110. In step 1110, the next FSCR entry is examined. Following step 1110, query 1112 returns the answer NO if this entry is not at the end of the FSCR, and the method 1100 then returns to query 1104. If, on the other hand, the entry examined is at the end of the FSCR, then the method terminates.

If, on the other hand, query 1108 had returned the answer YES, in that there was enough space on the page for the record, then the method proceeds to step 1114 and the record is inserted on the page. Query 1116 queries whether this is the only record on the page. If query 1116 returns the answer NO, then the method terminates. If, on the other hand, query 1116 returns the answer YES, then the method proceeds to step 1118 in which the empty page bit is set for the page (the page is no longer empty) before the method terminates.

Searching for a Free Block in the Table

Figure 12:
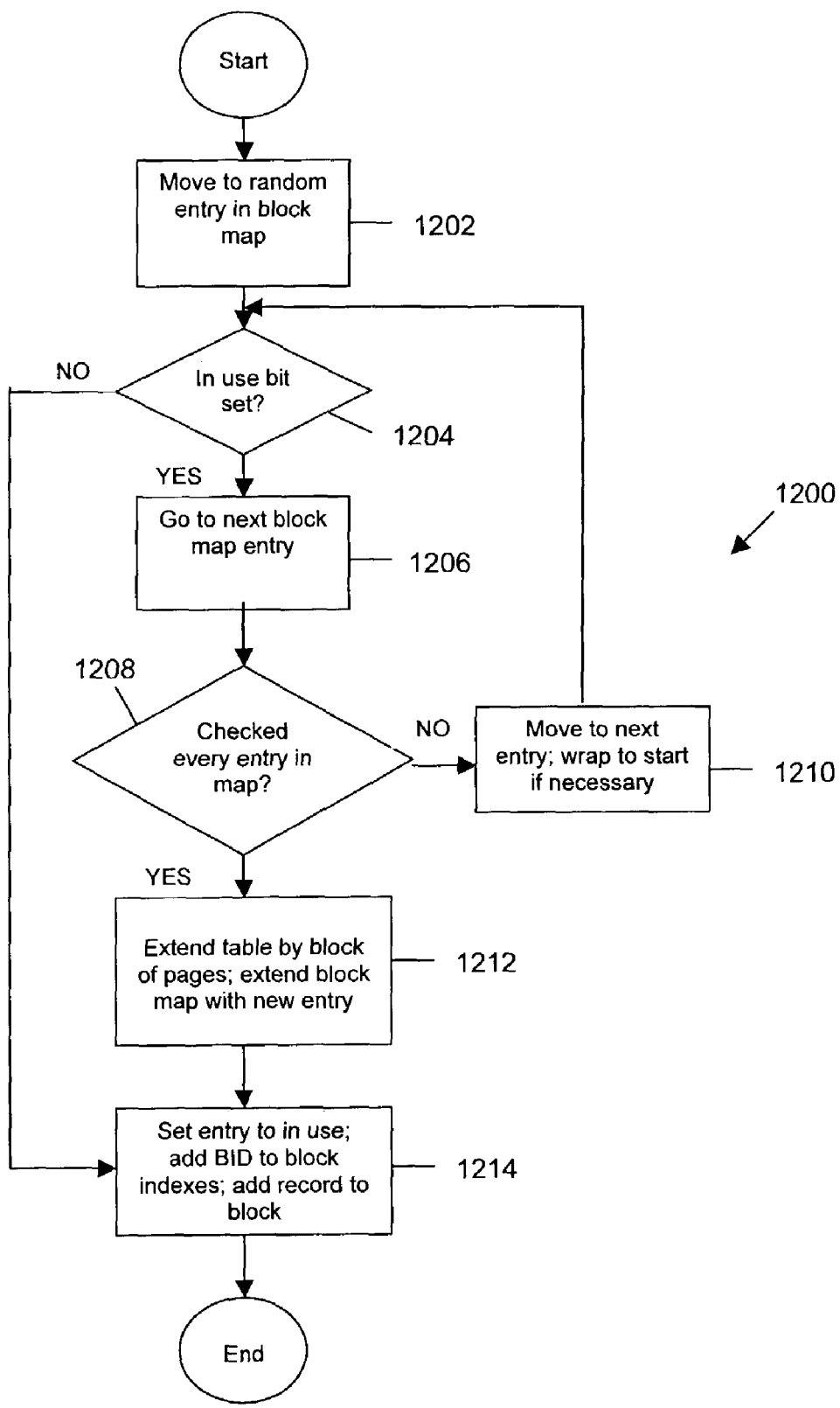
FIG. 12 is a flowchart illustrating a method for determining if there is a free block in the table available for re-use.

In step 1036 of FIG. 10, a free block in the table should be found to store data. Referring to FIG. 12, there is illustrated in a flowchart a method implemented in step 1036 of FIG. 10 for determining if there is a free block in the table available for reuse. In step 1202, the method begins at a random block map entry of the block map of FIG. 8. This is done so that the method does not always search from the same spot and end up scanning past what is already being reused. Then, the method checks whether the "in use" bit is set in query 1204. If the "in use" bit is set, then query 1204 returns the answer YES and the method proceeds to step 1206. If the "in use" bit is not set, then query 1204 returns the answer NO and the method proceeds to step 1214. In step 1214, the entry is set to "in use", the BID is added to the block indices, and the record is added to the block.

In step 1206, the method moves to the next entry in the block map. Query 1208 then queries whether every entry in the map has been checked. If query 1208 returns the answer NO, then the method proceeds to step 1210, and the method moves to the next entry or wraps back to the beginning of the block map before proceeding to query 1204. If query 1208 returns the answer YES, the method proceeds to step 1212. Step 1212 is reached if there are no blocks that are not in use in the block map. In step 1212, the table is extended by a block of pages and the block map is extended by one entry to designate this block of pages. The method then proceeds to step 1214 in which this new entry is set to "in use" in the block map, the BID for this block is recorded in the block indices, and the record is added to the block. The method then terminates.

Quickly Determine Whether the Delete of a Record Emptied the Block

An efficient method is required for determining when the last record in a block is deleted so that the block can be freed and made available for different dimension values. Although it is not difficult or expensive to determine whether the record being deleted is last on the page, it may be expensive to then check every page in the block to determine if they are all now empty. A bitmap is used to keep track of the empty state of each page in the block. When the block is allocated, its bitmap is initialized to zero, indicating that each page in the block is empty. When a record is inserted that is the first record inserted on a page, the bit for that page is set in the empty page map. When the last record is deleted from a page, its corresponding bit is unset and it is determined whether any bits remain set in the bitmap. This check is also optimized for efficiency. Only when the block's entire bitmap is zero can the block be freed and disassociated from its current cell.

Referring to step 1114 of FIG. 11, when a record is inserted on a page in the block, it is first determined whether the page is empty. If the page is empty, then the empty page bit is set for this page (step 1118), thereby indicating that the page is no longer empty.

Figure 13:
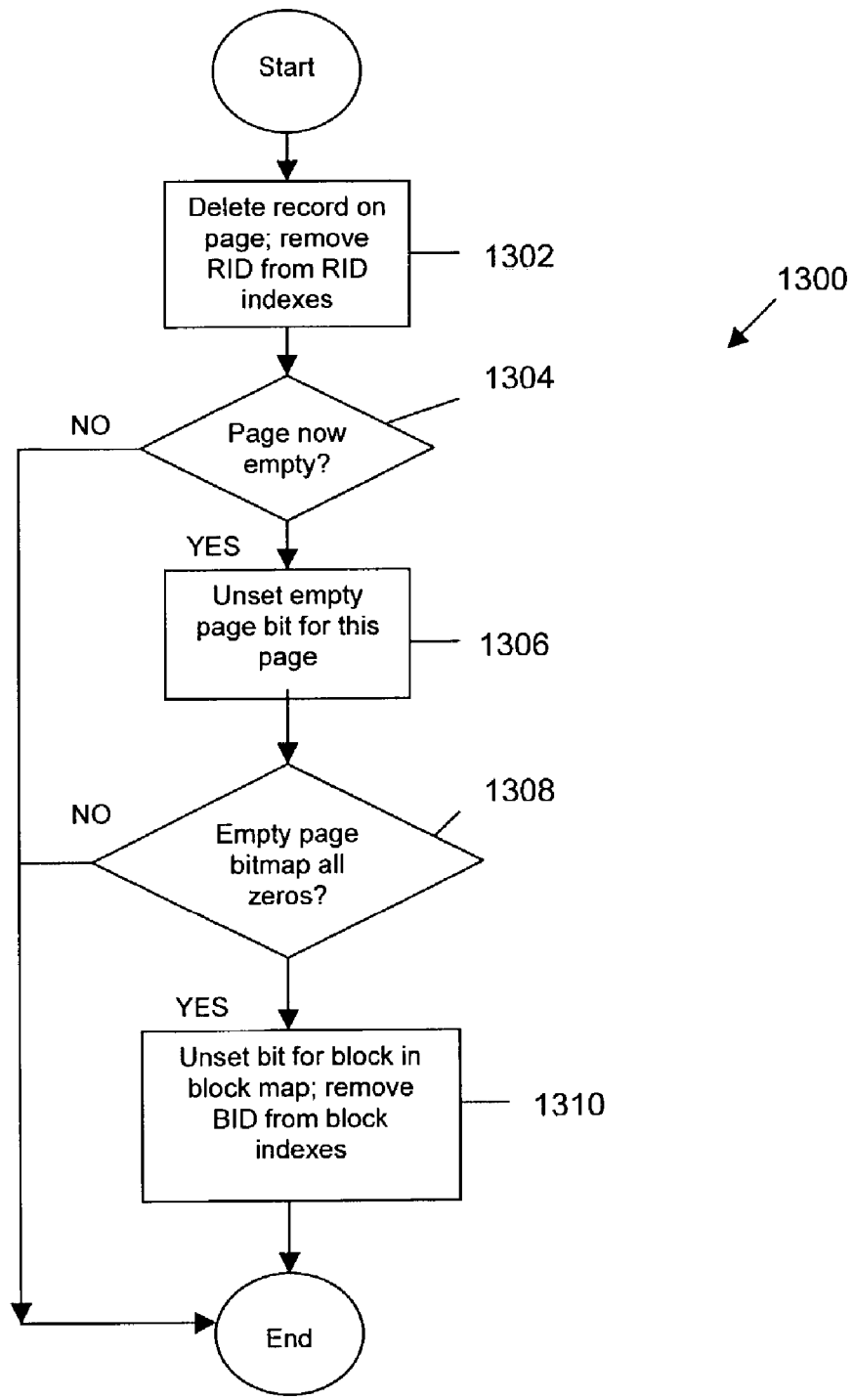
FIG. 13 is a flowchart of a method of deleting a record in accordance with a preferred or variant of the invention.

Referring to FIG. 13, there is illustrated in a flowchart an analogous method implemented when a record is deleted. In step 1302, the record is deleted, and the RID for the record is removed from any RID indices. The method then checks whether the page is now empty at que4y 1304. If the page is not empty, then query 1304 returns the answer NO and the method terminates. If the page is empty, then query 1304 returns the answer YES and the method proceeds to step 1306 in which the empty page bit associated with this page is unset. The method checks whether the entire empty page map is all zeros at query 1308. If the entire empty page bitmap is not all zeros, then query 1308 returns the answer NO and the method terminates. If, on the other hand, the entire empty page bitmap are all zeros, then the method proceeds to step 1310 in which the block is freed from the cell by unsetting its "in use" bit and removing its BID from the block indices. The method then terminates.

It is to be understood that the specific embodiments of the invention that have been described are merely illustrative of certain application of the principle of the present invention. Numerous modifications may be made to the system and method for space management of multidimensionally clustered tables invention described herein without departing from the spirit and scope of the present invention.

What is claimed is:

1. A computer program product stored on a computer readable storage medium for reducing the number of blocks searched when inserting a record into a multidimensional database and clustering data, the computer program product configured to cause:

receiving a record to be inserted into the multidimensional database, the record corresponding to a cell in the multidimensional database, wherein the cell is a unique combination of dimension values;

searching a composite dimension index for one or more blocks that correspond to the cell of the record to be inserted using a dimension key value, wherein the composite dimension index associates the cells in the multidimensional database with blocks on a storage device;

in response to finding a block having a key value matching the unique dimension values of the record to be inserted, determining whether a block identifier (BID) for the block indicates that the block is full;

in response to the BID indicating that the block is not full, searching the block for space to store the record to be inserted;

in response to the BID indicating that the block is full, adding the block to a list in memory of blocks with BIDs indicating that the blocks are full and determining whether a second block having a key value matching the unique dimension values of the record to be inserted has a BID indicating that the second block is full; and in response to finding space in the block to store the record to be inserted, inserting the record such that records corresponding to like cells in the multidimensional database are clustered.

2. The computer program product of claim 1, further comprising, in response to not finding a block corresponding to the cell of the record using the composite dimension index, assigning a new block to the cell and inserting the record into the new block.

3. The computer program product of claim 1, further comprising, in response to the BID indicating that the block is full, finding a second block having a key value matching the unique dimension values of the record to be inserted and determining whether the BID of the second block indicates that the block is full.

4. The computer program product of claim 1, wherein the BID comprises a bit that indicates whether the block is full.

5. The computer program product of claim 4, further comprising, in response to not finding space in the block to store the record to be inserted, flipping the bit of the BID that indicates that the block is full such that the BID indicates that the block is full and searching a second block having the key with the dimension values of the record to be inserted having a BID indicating that the block is not full for space to store the record to be inserted.

6. The computer program product of claim 1, further comprising, in response to all of the blocks having a key value matching the unique dimension values of the record to be inserted having BIDs indicating that the blocks are full, searching the blocks having a key value matching the unique dimension values of the record for space to store the record.

7. The computer program product of claim 6, further comprising, in response to none of the blocks having a key value matching the unique dimension values of the record having space to store the record, assigning a new block to the unique dimension values of the record, associating the new block with the unique dimension values in the composite dimension index, and storing the record in the new block.

8. A system for reducing the number of blocks searched when inserting a record into a multidimensional database and clustering data, the system comprising:

a multidimensional database executing on one or more processors and memory;

a computer program product for reducing the number of blocks searched when inserting a record in the multidimensional database, the computer program product configured to cause:

receiving a record to be inserted into the multidimensional database, the record corresponding to a cell in the multidimensional database, wherein the cell is a unique combination of dimension values;

searching a composite dimension index for one or more blocks that correspond to the cell of the record to be inserted using a dimension key value, wherein the composite dimension index associates the cells in the multidimensional database with blocks on a storage device;

in response to finding a block having a key value matching the unique dimension values of the record to be inserted, determining whether a block identifier (BID) for the block indicates that the block is full;

in response to the BID indicating that the block is not full, searching the block for space to store the record to be inserted;

in response to the BID indicating that the block is full, adding the block to a list in memory of blocks with BIDs indicating that the blocks are full and determining whether a second block having a key value matching the unique dimension values of the record to be inserted has a BID indicating that the second block is full; and in response to finding space in the block to store the record to be inserted, inserting the record such that records corresponding to like cells in the multidimensional database are clustered.

9. The system of claim 8, the computer program product further comprising instructions to cause, in response to not finding a block corresponding to the cell of the record using the composite dimension index, assigning a new block to the cell and inserting the record into the new block.

10. The system of claim 8, the computer program product further comprising instructions to cause, in response to the BID indicating that the block is full, finding a second block having a key value matching the unique dimension values of the record to be inserted and determining whether the BID of the second block indicates that the block is full.

11. The system of claim 8, wherein the BID comprises a bit that indicates whether the block is full.

12. The system of claim 11, the computer program product further comprising instructions to cause, in response to not finding space in the block to store the record to be inserted, flipping the bit of the BID that indicates that the block is full such that the BID indicates that the block is full and searching a second block having the key with the dimension values of the record to be inserted having a BID indicating that the block is not full for space to store the record to be inserted.

13. The system of claim 8, the computer program product further comprising instructions to cause, in response to all of the blocks having a key value matching the unique dimension values of the record to be inserted having BIDs indicating that the blocks are full, searching the blocks having a key value matching the unique dimension values of the record for space to store the record.

14. The system of claim 13, the computer program product further comprising instructions to cause, in response to none of the blocks having a key value matching the unique dimension values of the record having space to store the record, assigning a new block to the unique dimension values of the record, associating the new block with the unique dimension values in the composite dimension index, and storing the record in the new block.

15. A method for reducing the number of blocks searched when inserting a record into a multidimensional database that is operating on a processor and memory, the method comprising:
- receiving a record to be inserted into the multidimensional database operating on a processor and memory, the record corresponding to a cell in the multidimensional database, wherein the cell is a unique combination of dimension values;
- searching a composite dimension index for one or more blocks that correspond to the cell of the record to be inserted using a dimension key value, wherein the composite dimension index associates the cells in the multidimensional database with blocks on a storage device;
- in response to finding a block having a key value matching the unique dimension values of the record to be inserted, determining whether a block identifier (BID) for the block indicates that the block is full;
- in response to the BID indicating that the block is not full, searching the block for space to store the record to be inserted;
- in response to the BID indicating that the block is full, adding the block to a list in memory of blocks with BIDs indicating that the blocks are full and determining whether a second block having a key value matching the unique dimension values of the record to be inserted has a BID indicating that the second block is full; and
- in response to finding space in the block to store the record to be inserted, inserting the record such that records corresponding to like cells in the multidimensional database are clustered.

16. The method of claim 15, further comprising, in response to not finding a block corresponding to the cell of the record using the composite dimension index, assigning a new block to the cell and inserting the record into the new block.

17. The method of claim 15, further comprising, in response to the BID indicating that the block is full, finding a second block having a key value matching the unique dimension values of the record to be inserted and determining whether the BID of the second block indicates that the block is full.

18. The method of claim 15, wherein the BID comprises a bit that indicates whether the block is full.

19. The method of claim 18, further comprising, in response to not finding space in the block to store the record to be inserted, flipping the bit of the BID that indicates that the block is full such that the BID indicates that the block is full and searching a second block having the key with the dimension values of the record to be inserted having a BID indicating that the block is not full for space to store the record to be inserted.

20. The method of claim 15, further comprising, in response to all of the blocks having a key value matching the unique dimension values of the record to be inserted having BIDs indicating that the blocks are full, searching the blocks having a key value matching the unique dimension values of the record for space to store the record.

21. The method of claim 20, further comprising, in response to none of the blocks having a key value matching the unique dimension values of the record having space to store the record, assigning a new block to the unique dimension values of the record, associating the new block with the unique dimension values in the composite dimension index, and storing the record in the new block.

* * * * *